United States Patent [19]
Furuno

[11] Patent Number: 6,125,123
[45] Date of Patent: Sep. 26, 2000

[54] SIGNALING METHOD, SWITCHING SYSTEM, STORAGE MEDIUM AND NETWORK

[75] Inventor: Takayuki Furuno, Kawasaki, Japan

[73] Assignee: Fujitsu Limited, Kawasaki, Japan

[21] Appl. No.: 08/908,702

[22] Filed: Aug. 8, 1997

[30]   Foreign Application Priority Data

Mar. 14, 1997  [JP]  Japan .................................. 9-061312

[51] Int. Cl.⁷ .............. H04J 3/12; H04L 12/28; H04L 12/56; H04L 12/66
[52] U.S. Cl. ................. 370/467; 370/352; 370/373; 370/395; 370/410; 370/522
[58] Field of Search .................. 370/410, 522, 370/395, 230, 270, 373, 384, 467, 352, 218

[56]          References Cited

U.S. PATENT DOCUMENTS

| | | | |
|---|---|---|---|
| 5,012,466 | 4/1991 | Buhrke et al. | 370/270 |
| 5,825,780 | 10/1998 | Christie | 370/522 |
| 5,933,412 | 8/1999 | Choudhury et al. | 370/218 |
| 5,943,337 | 8/1999 | Sasagawa | 370/395 |
| 5,953,338 | 9/1999 | Ma et al. | 370/395 |
| 5,956,334 | 9/1999 | Chu et al. | 370/352 |

*Primary Examiner*—Hassan Kizou
*Assistant Examiner*—John Pezzlo
*Attorney, Agent, or Firm*—Staas & Halsey LLP

[57]           ABSTRACT

A signaling method for a communication uses a signaling protocol, and includes the steps of making a re-connect request with respect to a receiving side end system from a certain system which is coupled to the receiving side end system, in place of a transmitting side end system, when the receiving side end system rejects a call connect request from the transmitting side end system, so that there is no need for the transmitting side end system to make a re-connect request even when the connect request from the transmitting side end system is rejected by the receiving side end system, and the connection can be established within a relatively short time.

32 Claims, 12 Drawing Sheets

SIGNALING METHOD, SWITCHING SYSTEM, STORAGE MEDIUM AND NETWORK

BACKGROUND OF THE INVENTION

The present invention generally relates to signaling methods, switching systems, storage mediums and networks, and more particularly to a signaling method, a switching system, a storage medium and a network which are applied to communications using a signaling protocol.

Much attention is drawn to the Broadband Integrated Services Digital Network (B-ISDN) using Asynchronous Transfer Mode (ATM) as a switching technique which integrates information such as data, voice and image. Two connection types, namely, a Permanent Virtual Channel (PVC) and a Switched Virtual Channel (SVC), are prepared for the B-ISDN. The PVC does not use a signaling protocol, and conditions related to the connection, such as the connection identifier and band, are all input. On the other hand, the SVC operates a signaling protocol between nodes so as to set a connection between end systems, and a required band may be requested when required. However, depending on a service quality request such as the band and delay, a support protocol of the other party to be connected, and the like, there is a possibility that the SVC cannot make the connection. For this reason, when the signaling protocol is applied to the ATM-Local Area Network (ATM-LAN) and the connection cannot be made, the undesirable effects caused thereby are large.

Conventionally, the LAN uses a shared media and transmits data within the same segment, and provides a connectionless type communication which has no concept of connection. For this reason, in the LAN-ATM-LAN connection using the SVC, it takes time to establish the connection in the ATM and thereby affects the transfer of the data generated in the LAN to the ATM connection.

Normally, the connection type communication using the signaling protocol uses a signaling protocol prescribed by an international standardization organization such as the International Telecommunication Union-Telecommunication Standardization Sector (ITU-T) and the ATM Forum, and the transmission of the user data becomes possible only after the connection between the end systems is established. The signaling protocol prescribes the messages, procedure and the like exchanged between the end systems, and new messages and information elements may be added in order to expand the functions. On the other hand, certain information may be deleted and the procedure may be modified in the signaling protocol. In addition, in order to make the standard flexible, a portion of the message and the procedure may be prescribed as being optional, and the operation at the time of receiving the message may be by way of implementation.

A description will be given of a general connection establishing procedure of a conventional point-to-point communication for a case where connection establishment is successful, by referring to FIG. 1. This procedure is based on a standard decided by the international standardization organization. The exchange of the messages described hereunder are made using the connection for the signaling message. It is assumed that an ATM End System (AES) 101 receives a frame from the LAN, and transfers this frame to an AES 104 at the receiving end. This procedure is realized by the following steps (S1) through (S6).

(S1) The AES 101 transmits a call setup message SETUP to an ATM switching system 102 via a User Network Interface (UNI) A. This message SETUP includes a band requested by the AES 101, a Quality of Service (QoS) and the like.

(S2) The ATM switching system 102 which receives the message SETUP from the UNI A reserves a Virtual Path Identifier (VPI) or a Virtual Channel Identifier (VCI) which is a connection identifier used in the UNI A if the ATM switching system 102 can accept the message SETUP, that is, if the ATM switching system 102 can provide the conditions included in the message SETUP. A connect message CONNECT is used to notify the connection identifier to the AES 101. In addition, the ATM switching system 102 transfers the message SETUP to an adjacent ATM switching system 103 via a Network Node Interface (NNI).

(S3) The ATM switching system 103 which receives the message SETUP from the ATM switching system 102 allocates a connection identifier used in a UNI B and transmits the message SETUP including this connection identifier to the AES 104 if the ATM switching system 103 can accept the message SETUP, similarly to the ATM switching system 102.

(S4) The AES 104 which receives the message SETUP from the ATM switching system 103 responds by a message CONNECT with respect to the AES 101 if the AES 104 can accept the message SETUP, similarly to the ATM switching systems 102 and 103.

(S5) The ATM switching systems 103 and 102 which receive the response by the message CONNECT from the AES 104 respectively transfer the message CONNECT to the AES 101.

(S6) When the AES 101 receives the message CONNECT, the AES 101 judges that the connection to the AES 104 is set, and uses the allocated connection identifier to start transmission of ATM cells generated from the frame received from the LAN.

In FIG. 1, only the message SETUP and the message CONNECT are used for the sake of convenience. Actually, however, other messages are also used, such as a response confirmation message which indicates that the message transmitted from the transmitting side AES 101 is received by the receiving side AES 104.

Next, a description will be given of the procedure for a case where the connection is rejected by the receiving side AES when the connection establishment of the point-to-point communication is requested using the above described procedure, that is, when the connection establishment fails, by referring to FIG. 2. In FIG. 2, those parts which are the same as those corresponding parts in FIG. 1 are designated by the same reference numerals, and a description thereof will be omitted. This procedure is realized by the following steps (ST1) through (ST6).

(ST1) The AES 101 transmits a message SETUP to the ATM switching system 102 via the UNI A.

(ST2) The ATM switching system 102 which receives the message SETUP from the UNI A reserves a connection identifier (VPI or VCI) used in the UNI A if the ATM switching system 102 can accept the message SETUP, that is, if the ATM switching system 102 can provide the conditions included in the message SETUP. A connect message CONNECT is used to notify the connection identifier to the AES 101. In addition, the ATM switching system 102 transfers the message SETUP to the adjacent ATM switching system 103 via the NNI.

(ST3) The ATM switching system 103 which receives the message SETUP from the ATM switching system 102 allocates a connection identifier used in the UNI B and transmits the message SETUP including this connection identifier to the AES 104 if the ATM switching system 103 can accept the message SETUP, similarly to the ATM switching system 102.

(ST4) The AES 104 which receives the message SETUP from the ATM switching system 103 responds by a release complete message REL COMP with respect to the AES 101 if an information element which cannot be recognized is included in the message SETUP, a required information element is not included in the message SETUP or, it is judged that the conditions such as the requested band cannot be provided.

(ST5) The ATM switching systems 103 and 102 which receive the message REL COMP respectively transfer the message REL COMP to the AES 101, and release the connection identifiers allocated to the corresponding UNIs A and B.

(ST6) When the AES 101 receives the message REL COMP, the AES 101 notifies the user or application of a host that the setting of the connection failed. The operation thereafter follows the judgement of the user or application, and if a re-connect request or a re-transmit request is made, a new message SETUP is transmitted. In this case, however, a reference which is used to judge whether or not to change the contents of the message SETUP is not yet established at the present.

In FIG. 2, only the message SETUP, the message CONNECT and the message REL COMP are used for the sake of convenience. Actually, however, other messages are also used, such as the response confirmation message which indicates that the message transmitted from the transmitting side AES 101 is received by the receiving side AES 104. In addition, t in FIG. 2 indicates a time it takes for the AES 101 to transmit the data from the time when the AES 101 receives the frame (data) from the LAN.

A connection request from the transmitting side end system may be rejected because the connection cannot be guaranteed by the network or the receiving side end system. In this case, the rejection is made as a result of a negotiation which is made in relation to the connection to be set, and this rejection is inevitable in order to establish a connection which can guarantee the required band or service. In order to cope with such a situation, measures which are devised to increase the connection probability are considered within the standard, by making it possible to make two band requests, one for a large band and another for a small band.

However, when the signaling protocol is revised and the information essential for the conventional message SETUP is deleted, it may be impossible to communicate between two end systems supporting different versions of the signaling protocol. For this reason, when the connection request from the transmitting side end system is rejected by the receiving side end system, there was a problem in that the connection must basically be abandoned.

On the other hand, even if the transmitting side end system supports all versions of the signaling protocol, there is no means of knowing the version of the signaling protocol that can be supported by the receiving side end system to which the connection is to be made. For this reason, depending on the result of the call setup request which is once made, it is necessary to make a re-connect request, and there was a problem in that it takes time to establish the connection. For example, in a system in which an apparatus provided with both a LAN interface and an ATM interface sets the SVC in response to the frame received from the LAN interface, the time it takes for the connection to be set greatly affects the end system in the LAN because the end system transmits the frame without being conscious of the existence of a connection in the ATM system.

SUMMARY OF THE INVENTION

Accordingly, it is a general object of he present invention to provide a novel and useful signaling method, switching system, storage medium and network, in which the problems described above are eliminated.

Another and more specific object of the present invention is to provide a signaling method, a switching system, a storage medium and a network, which can establish a connection in a relatively short time without requiring a re-connect request from a transmitting side end system even if a connect request from the transmitting side end system is rejected by a receiving side end system, and can reduce a holding time of transmission data in the transmitting side end system.

Still another object of the present invention is to provide a signaling method for a communication using a signaling protocol, comprising the steps of making a re-connect request with respect to a receiving side end system from a certain system which is coupled to the receiving side end system, in place of a transmitting side end system, when the receiving side end system rejects a call connect request from the transmitting side end system. According to the signaling method of the present invention, there is no need for the transmitting side end system to make a re-connect request even when the connect request from the transmitting side end system is rejected by the receiving side end system, and the connection can be established within a relatively short time. In addition, since it is possible to reduce the transmitting data hold time at the transmitting side end system, the present invention is particularly effective when applied to a large scale network having a large transmission delay.

A further object of the present invention is to provide a switching system for relaying messages among networks by supporting a signaling protocol when making a communication using the signaling protocol, wherein the switching system is coupled to a receiving side end system, and the switching system comprises means for making a re-connect request with respect to the receiving side end system in place of a transmitting side end system when the receiving end system rejects a call connect request from the transmitting side end system. According to the switching system of the present invention, there is no need for the transmitting side end system to make a re-connect request even when the connect request from the transmitting side end system is rejected by the receiving side end system, and the connection can be established within a relatively short time. In addition, since it is possible to reduce the transmitting data hold time at the transmitting side end system, the present invention is particularly effective when applied to a large scale network having a large transmission delay.

Another object of the present invention is to provide a storage medium storing a program to be executed by a computer for making a switching system relay messages among networks by supporting a signaling protocol when making a communication using the signaling protocol, wherein the switching system is coupled to a receiving side end system, and the storage medium comprises means for controlling the switching system to make a re-connect request with respect to the receiving side end system in place of a transmitting side end system when the receiving end system rejects a call connect request from the transmitting side end system. According to the storage medium of the present invention, there is no need for the transmitting side end system to make a re-connect request even when the connect request from the transmitting side end system is rejected by the receiving side end system, and the connection can be established within a relatively short time. In addition, since it is possible to reduce the transmitting data hold time at the transmitting side end system, the present invention is particularly effective when applied to a large scale network having a large transmission delay. Furthermore, the above described functions can be realized by a modification of the existing software.

Still another object of the present invention is to provide a network adapted to a communication using a signaling protocol, comprising means for making a re-connect request with respect to a receiving side end system from a certain system which is coupled to the receiving side end system, in place of a transmitting side end system, when the receiving side end system rejects a call connect request from the transmitting side end system. According to the network of the present invention, there is no need for the transmitting side end system to make a re-connect request even when the connect request from the transmitting side end system is rejected by the receiving side end system, and the connection can be established within a relatively short time. In addition, since it is possible to reduce the transmitting data hold time at the transmitting side end system, the present invention is particularly effective when applied to a large scale network having a large transmission delay.

Other objects and further features of the present invention will be apparent from the following detailed description when read in conjunction with the accompanying drawings.

DESCRIPTION OF THE PREFERRED EMBODIMENTS

Figure 3:
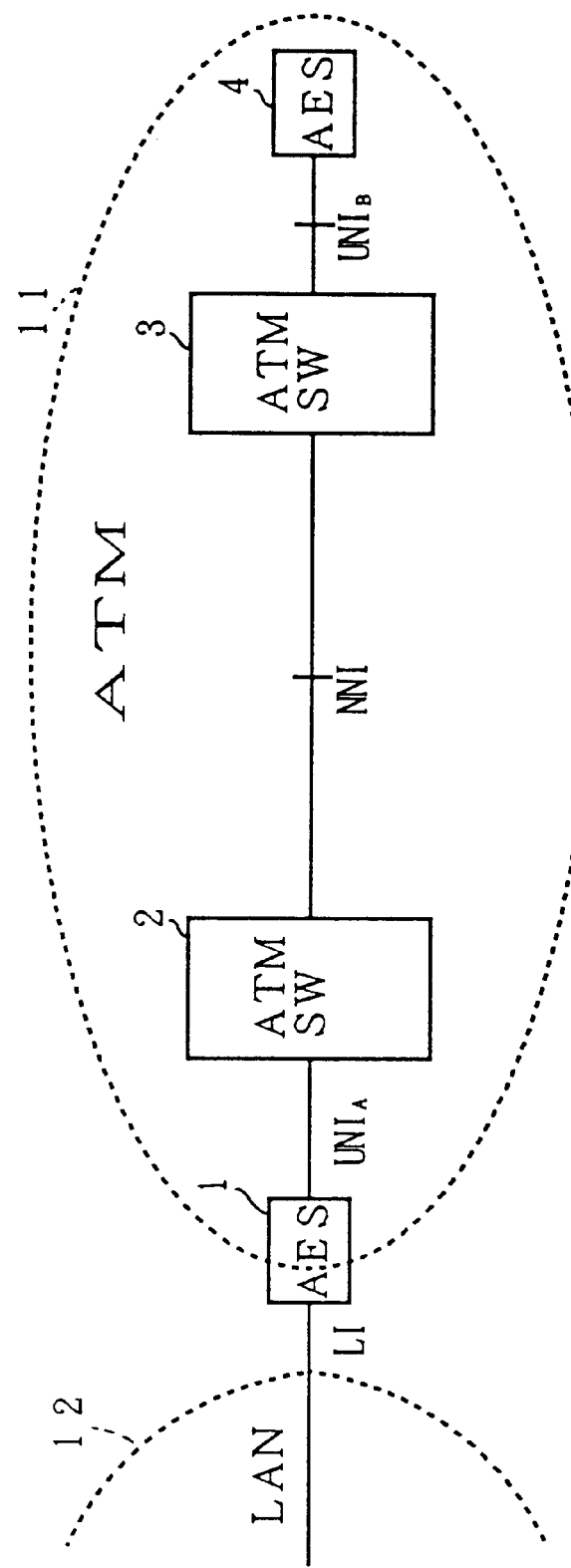
FIG. 3 is a diagram showing an embodiment of a network to which a first embodiment of a signaling method according to the present invention is applied.

FIG. 3 is a diagram showing an embodiment of a network to which a first embodiment of a signaling method according to the present invention is applied. In this embodiment, the present invention is applied to an ATM system, and in FIG. 3, it is a precondition that each node supports the signaling protocol.

In FIG. 3, AESs 1 and 4, UNIs A and B, ATM switching systems 2 and 3, and a NNI are provided in an ATM network 11. This ATM network 11 is coupled to a LAN 12 via the AES 1.

Each of the ATM switching systems 2 and 3 switches to an appropriate port depending on a connection identifier (VPI/VCI) which is written in a header of the ATM cell. In addition, each of the ATM switching systems 2 and 3 has two kinds of interfaces, that is, a UNI and a NNI. The AES 4 is an end system which terminates the ATM connection, and is coupled to the ATM switching system 3 which has the UNI. The AES 1 has a LAN interface LI in addition to the ATM interface (UNI) similar to that of the AES 4.

When the AES 1 judges that a LAN frame received from the LAN 12 via the LAN interface LI needs to be transferred to the ATM network 11, the AES 1 sets a SVC with respect to a destination ATM address using the signaling protocol, and thereafter generates and transmits the ATM cells. The ATM connection is terminated between the AESs 1 and 4 via the ATM switching systems 2 and 3.

In the ATM network 11 shown in FIG. 3, the data are all divided into units of 48 bytes, and a 5-byte header including information such as the connection identifier is added to this 48-byte unit to form a 53-byte ATM cell, so that the information is exchanged by such ATM cells. The ATM cells are transmitted via logical connections in the physical lines. There are two kinds of logical connections, namely, the PVC and the SVC. The PVC is a connection which manually sets the connection identifier in each of the nodes, such as the AESs 1 and 4 and the ATM switching systems 2 and 3, and allocates a fixed band. In the case of the PVC, it is possible to use the given fixed band any time when the data transmission is required. On the other hand, the SVC allocates the connection identifier and the band together with other parameters, by carrying out the signaling protocol among the nodes. Hence, in the case of the SVC, the signaling protocol is carried out and the connection of the required band is established, every time the data transmission is made. When the data transmission is completed, the resource is released by disconnecting the used connection. The connection and release procedures described above are basically equivalent to the connection and release procedures of the telephone.

Figure 4:
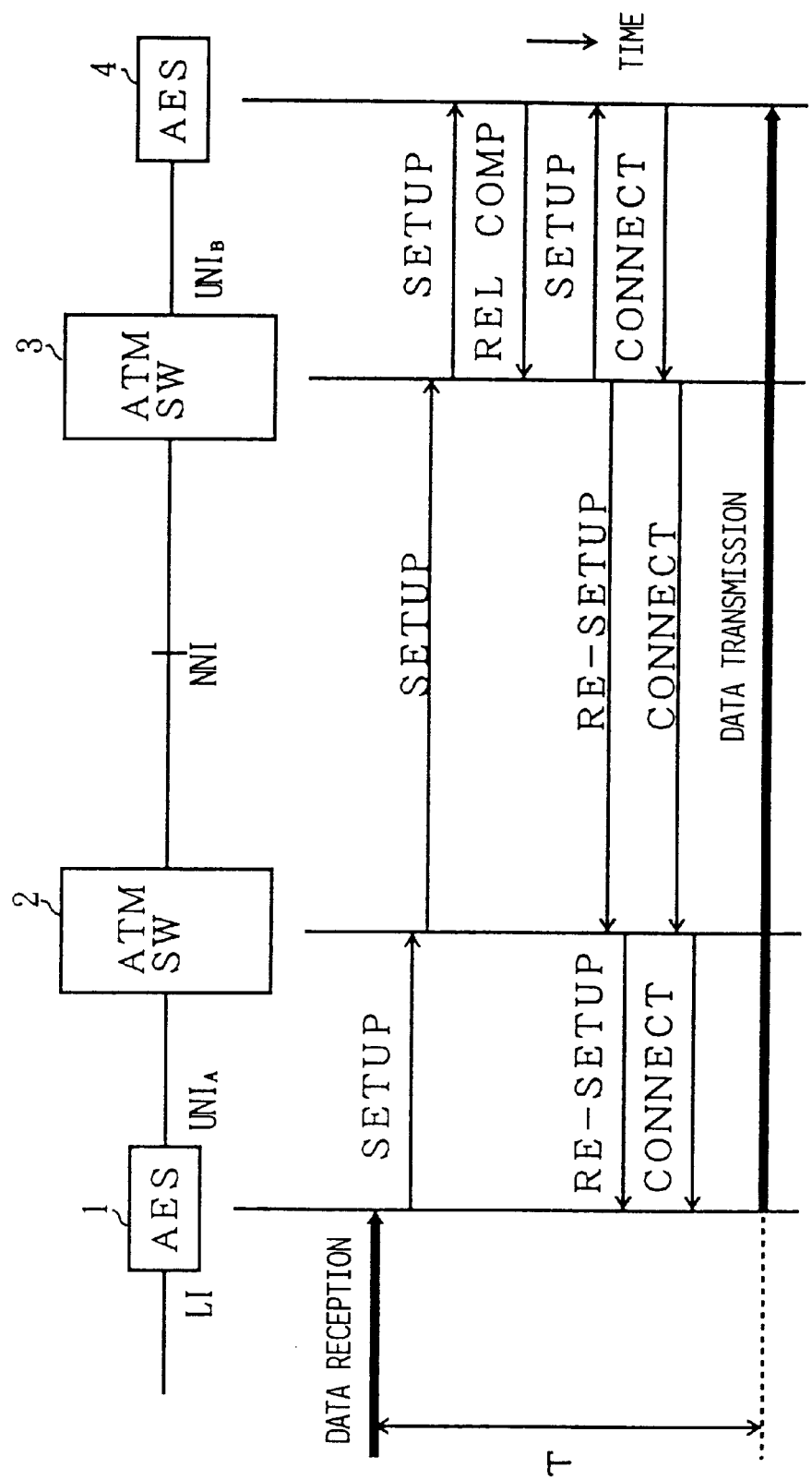
FIG. 4 is a diagram for explaining a connection establishing procedure in the first embodiment of the signaling method.

FIG. 4 is a diagram for explaining the connection establishing procedure of this embodiment. In FIG. 4, those parts which are the same as those corresponding parts in FIG. 3 are designated by the same reference numerals, and a description thereof will be omitted. FIG. 4 shows a case where the first connection establishment by the AES 1 fails and, as a result of a re-connection establishing request made by the ATM switching system 4, the re-connection establishment is successful. In this case, the present invention is applied to the point-to-point communication of the ATM system.

Figure 1:
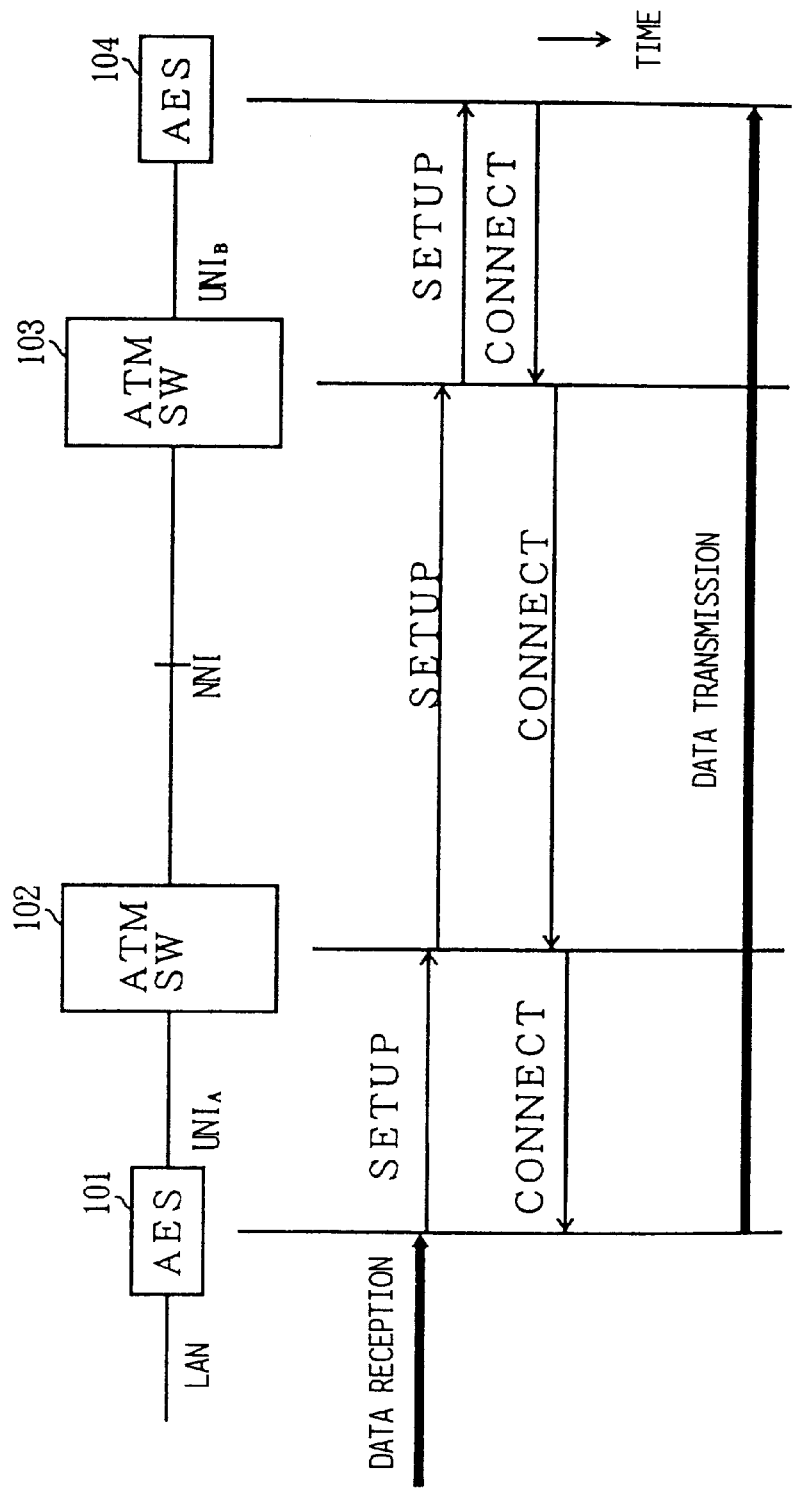
FIG. 1 is a diagram for explaining a general connection establishing procedure of a conventional point-to-point communication for a case where the connection establishment is successful.
Figure 2:
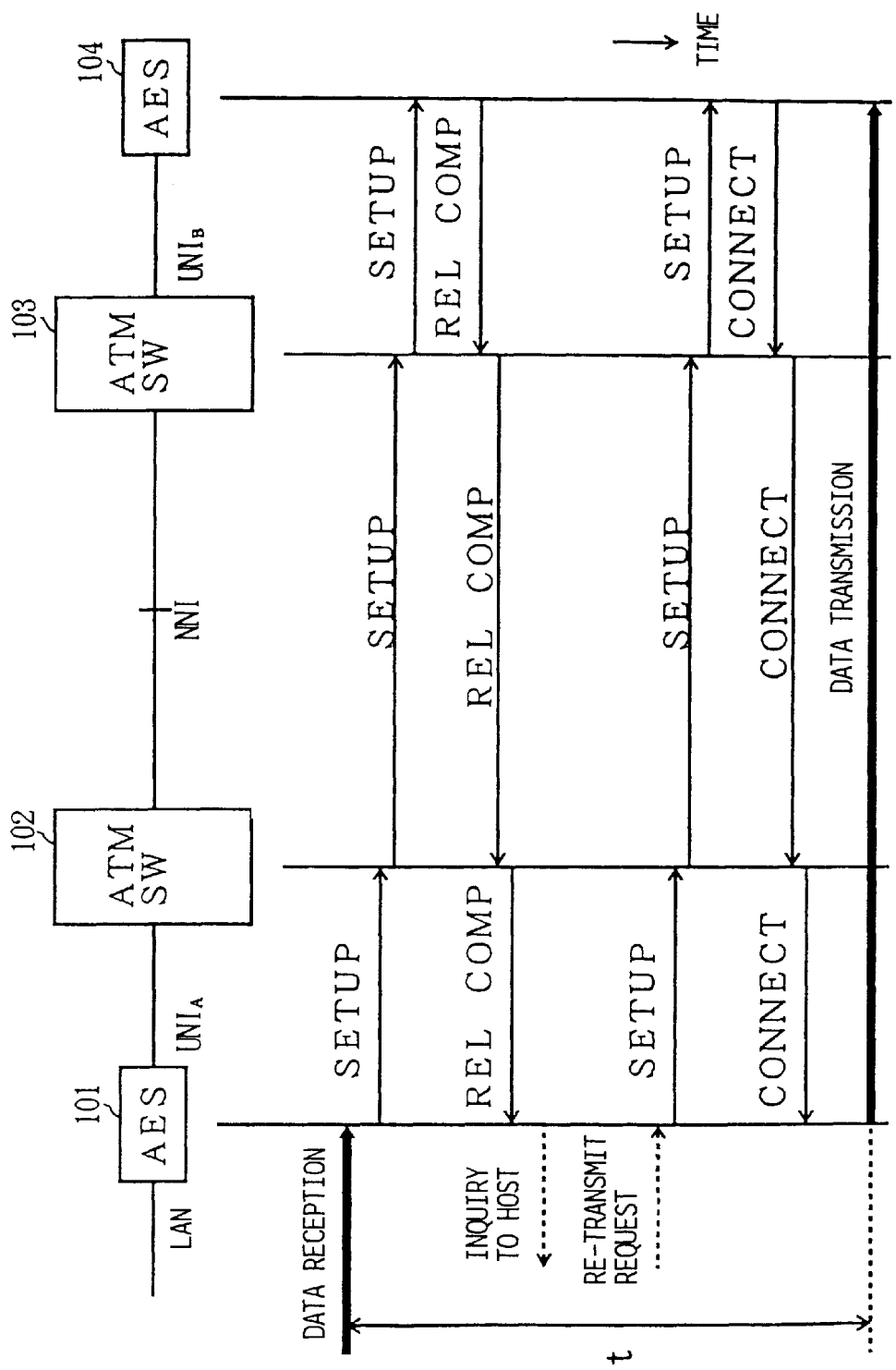
FIG. 2 is a diagram for explaining the procedure for a case where the connection establishment fails when the connection establishment of the point-to-point communication is requested.

In the call connect procedure of the point-to-point communication similar to that described above in conjunction with FIG. 2, the operation for the case where the receiving side AES 4 responds by a release complete message REL COMP with respect to a call setup message SETUP transmitted from the transmitting side AES 1 becomes as shown in FIG. 4 as described in the following. In other words, this connection establishing procedure is realized by the following steps (s1) through (s10).

(s1) The AES 1 transmits a call setup message SETUP to the ATM switching system 2 via the UNI A. This message SETUP includes the band requested by the AES 1, the QoS and the like.

(s2) The ATM switching system 2, which receives the message SETUP from the UNI A, reserves a connection identifier (VPI or VCI) used in the UNI A if the ATM switching system 2 can accept the message SETUP, that is, if the ATM switching system 2 can provide the conditions included in the message SETUP. A connect message CONNECT is used to notify the connection identifier to the AES 1. In addition, the ATM switching system 2 transfers the message SETUP to the adjacent ATM switching system 3 via the NNI.

(s3) The ATM switching system 3, which receives the message SETUP from the ATM switching system 2 allocates a connection identifier used in the UNI B and transmits the message SETUP including this connection identifier to the AES 4 if the ATM switching system 3 can accept the message SETUP, similarly to the ATM switching system 2. In addition, the ATM switching system 3, saves a copy of the first message SETUP transmitted from the AES 1.

(s4) The AES 4, which receives the message SETUP from the ATM switching system 3, responds by a release complete message REL COMP with respect to the AES 1 if an information element which cannot be recognized is included in the message SETUP, a required information element is not included in the message SETUP or, it is judged that the conditions such as the requested band cannot be provided.

(s5) The ATM switching system 3 which receives the message REL COMP, first modifies the contents of the saved first message SETUP, transmitted from the AES 1, and transmits the message SETUP having the modified contents to the AES 4. This modification of the contents of the message SETUP by the ATM switching system 3 is based on a rejecting reason if this rejection reason is clearly included in the message REL COMP by the AES 4 or, based on signaling information of the AES 4 obtained beforehand using an Interim Local Management Interface (ILMI) protocol or the like which is used to exchange information between the adjacent nodes. Normally, the ILMI protocol is the protocol used between the adjacent nodes when exchanging information for network management, registering address and the like. On the other hand, the signaling information includes version information of the signaling protocol.

In a case where the signaling information which is obtained beforehand includes the version information of the signaling protocol, the modification of the contents of the message SETUP by the ATM switching system 3 is the deletion of an information element that is not used by the AES 4, the addition of an essential information element used by the AES 4 and the like.

(s6) Next, the ATM switching system 3 notifies the transmitting side AES 1 that the second message SETUP is transmitted to the receiving side AES 4. In addition, in order to indicate the contents of this second message SETUP, the ATM switching system 3 transmits to the AES 1 a re-setup message RE-SETUP which includes the same contents as the second message SETUP. This message RE-SETUP also includes an identifier which indicates the relationship to the first message SETUP transmitted from the AES 1.

(s7) When the AES 4 receives the second message SETUP, the AES 4 responds by a connect message CONNECT if the contents of the second message SETUP can be accepted. In this state, the AES 4 is unconscious of the relationship the second message SETUP has with respect to the first message SETUP, and operates similarly to the case where the normal message SETUP is received.

(s8) On the other hand, the message RESETUP from the ATM switching system 3 is transferred to the transmitting side AES 1 via the ATM switching system 2.

(s9) When the transmitting side AES 1 receives the message RE-SETUP, this AES 1 recognizes that the contents of the first message SETUP that is transmitted are modified and re-transmitted by the ATM switching system 3 which is coupled to the receiving side AES 4. In this state, if the contents of the message RE-SETUP satisfy the AES 1, a state transition timer within the AES 1 is reset or the setting of the state transition timer is changed, so as to wait for the receipt of a next message which is transmitted. The state transition timer manages a tolerable time from the time when the AES 1 transmits a message to the time when a response message is returned. By controlling this state transition timer, it is possible to manage the timing with which the AES 1 returns a response message with respect to an incoming message.

If the contents of the message RE-SETUP do not satisfy the AES 1, the AES 1 transmits a release complete message REL COMP with respect to the ATM switching systems 2 and 3.

(s10) In the above described step (s7), if the receiving side AES 4 can accept the contents of the second message SETUP and responds by a connect message CONNECT, this message CONNECT is transmitted to the transmitting side AES 1 via the ATM switching systems 3 and 2. The transmission of the ATM cells from the AES 1 starts after the AES 1 receives this message CONNECT.

In FIG. 4, only the message SETUP, the message CONNECT, the message REL COMP and the message RE-SETUP are used for the sake of convenience. Actually, however, other messages are also used, such as the response confirmation message which indicates that the message transmitted from the transmitting side AES 1 is received by the receiving side AES 4. In addition, T in FIG. 4 indicates a time it takes for the AES 1 to transmit the data from the time when the AES 1 receives the frame (data) from the LAN 12.

Figure 5:
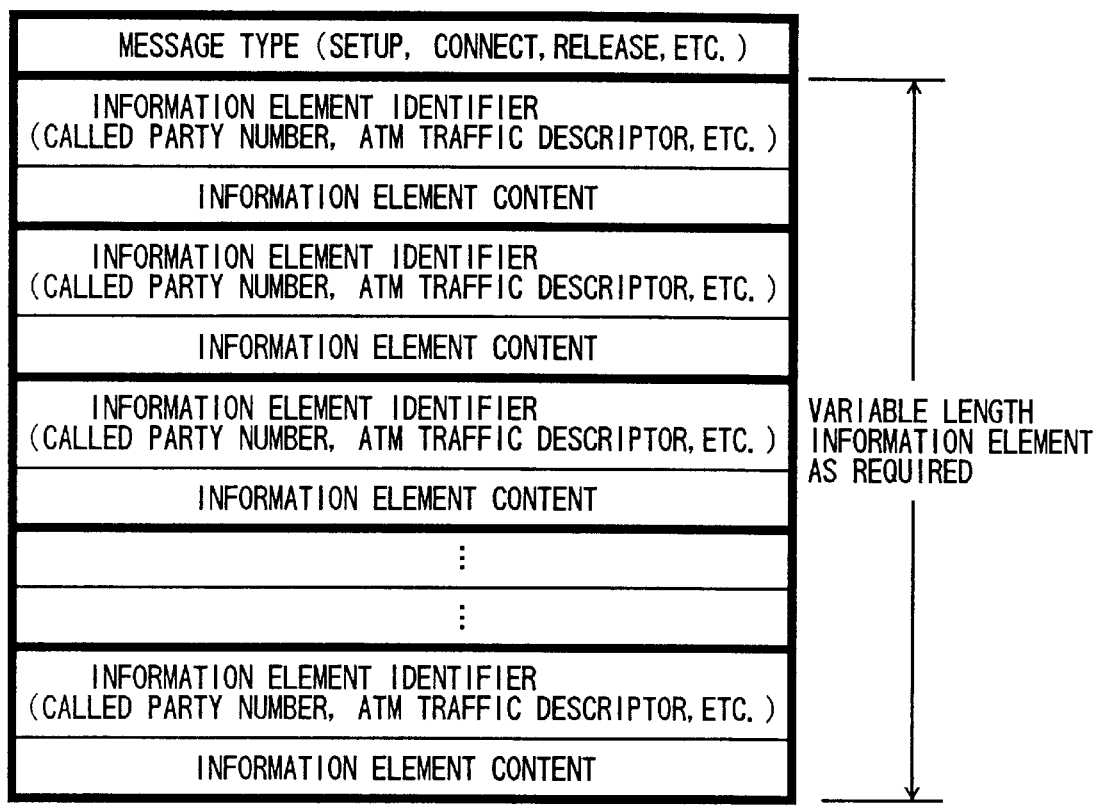
FIG. 5 is a diagram showing the construction of a signaling message.

FIG. 5 is a diagram showing the construction of the signaling message used in this embodiment. In FIG. 5, the signaling message includes a message type for identifying the messages, information element identifiers for identifying a called party number, ATM traffic descriptor and the like, and information element contents. The message type identifies the message SETUP, the message CONNECT, the message REL COMP, the massage RE-SETUP, a release message RELEASE and the like. The information element identifiers and the information element contents form a variable length information element as required.

Next, a description will be given of an important part of the message processing procedure of the receiving side AES 4, the receiving side ATM switching system 3 and the transmitting side AES 1, by referring to FIGS. 6 through 8.

Figure 6:
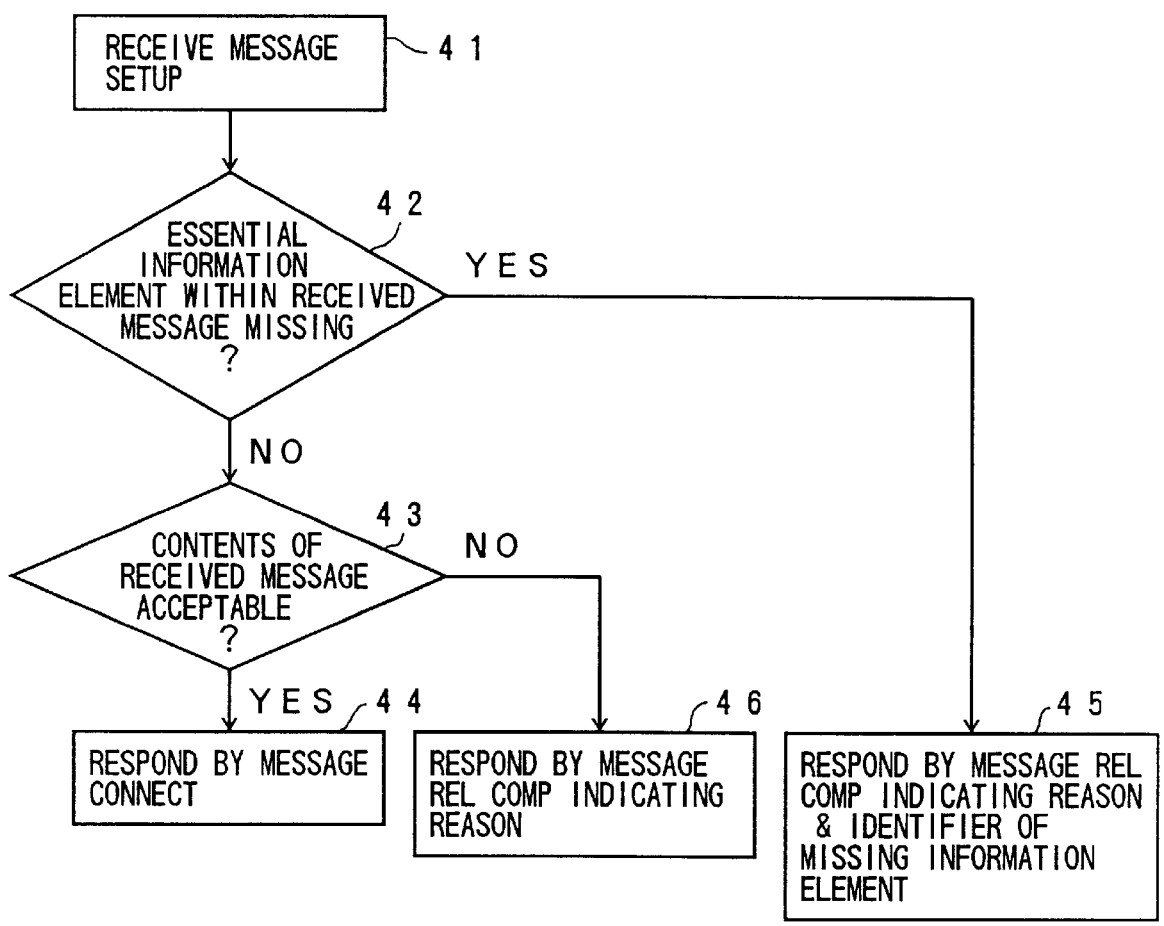
FIG. 6 is a flow chart for explaining a setup message processing procedure of a receiving side AES.

FIG. 6 is a flow chart for explaining a processing procedure of the receiving side AES 4 with respect to a call setup message SETUP. In FIG. 6, when a call setup message SETUP from the receiving side ATM switching system 3 is received in a step 41, a step 42 decides whether or not an essential information element is missing from the received message SETUP. If no essential information element is missing and the decision result in the step 42 is NO, a step 43 decides whether or not the contents of the received message SETUP can be accepted. If the contents are acceptable and the decision result in the step 43 is YES, a step 44 transmits a connect message CONNECT to the receiving side ATM switching system 3 and responds with respect to the message SETUP. On the other hand, if the decision result in the step 42 is YES, a step 45 responds with respect to the receiving side ATM switching system 3 by a release complete message REL COMP including identifiers which indicate the reason why the essential information element is missing and indicate the missing information element. In addition, if the decision result in the step 43 is NO, a step 46 responds with respect to the receiving side ATM switching system 3 by a release complete message REL COMP including an identifier which indicates the reason why the contents cannot be accepted.

Figure 7:
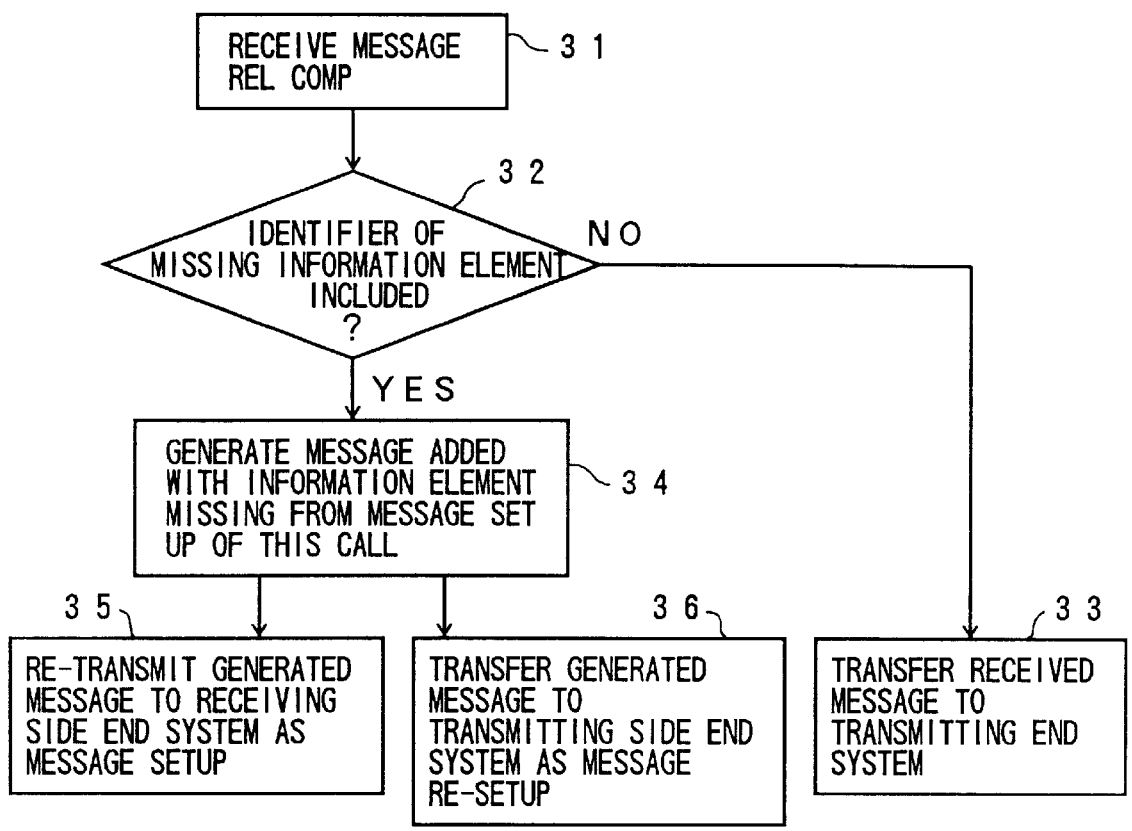
FIG. 7 is a flow chart for explaining a setup message re-transmit procedure of a receiving side ATM switching system.

FIG. 7 is a flow chart for explaining a retransmit procedure of the receiving side ATM switching system 3 with respect to a call setup message SETUP. In FIG. 7, when a release complete message REL COMP from the receiving side AES 4 is received in a step 31, a step 32 decides whether or not the received message REL COMP includes the identifier which indicates the missing information element. If the decision result in the step 32 is NO, a step 33 transmits the received message REL COMP to the transmitting side AES 1 via the transmitting side ATM switching system 2. On the other hand, if the decision result in the step 32 is YES, a step 34 generates a message which is added with the information element missing from the message SETUP of this call. In addition, a step 35 re-transmits the message which is generated in the step 34 to the receiving side AES 4 as a call setup message SETUP. At the same time, a step 36 transfers the message which is generated in the step 34 to the transmitting side AES 1 via the transmitting side ATM switching system 2 as a message RE-SETUP. The step 35 may be started before the step 36 as in the case shown in FIG. 4, or started simultaneously as the step 36. Further, the step 35 may be started after the step 36 as in the case of a fourth embodiment of the signaling method according to the present invention which will be described later.

Figure 8:
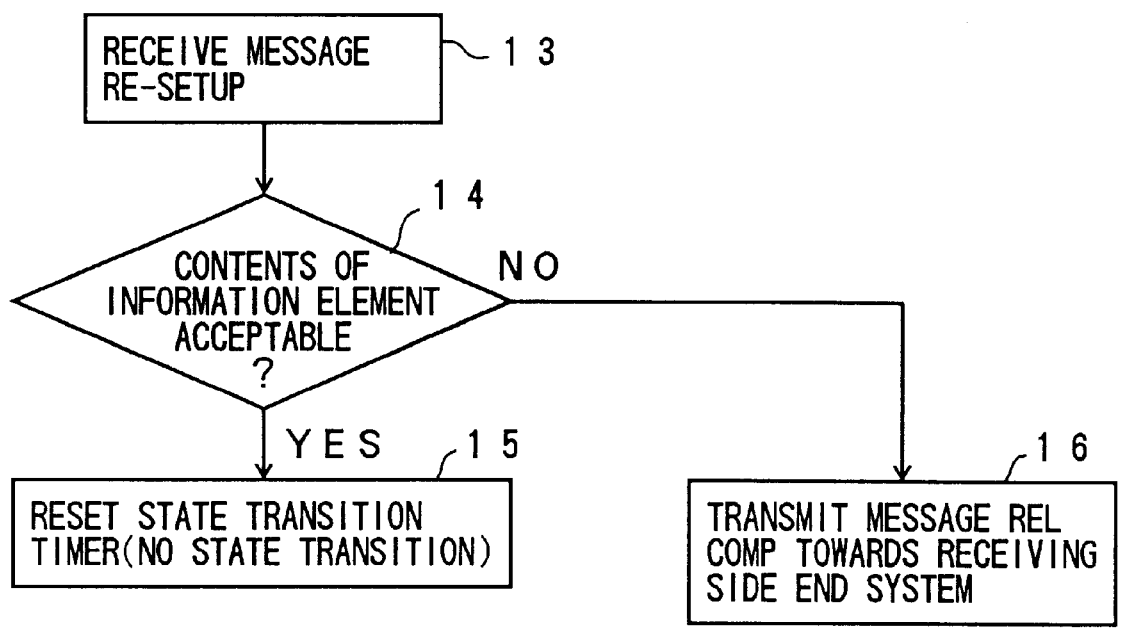
FIG. 8 is a flow chart for explaining a resetup message processing procedure of a transmitting side AES.

FIG. 8 is a flow chart for explaining a processing procedure of the transmitting side AES 1 with respect to a message RE-SETUP. In FIG. 8, when a message RE-SETUP from the receiving side ATM switching system 3 is received via the transmitting side ATM switching system 2 in a step 13, a step 14 decides whether or not the contents of the information elements included in the received message RE-SETUP can be accepted. If the decision result in the step 14 is YES, a step 15 resets the state transition timer. In this case, there is no state transition. On the other hand, if the decision result in the step 14 is NO, a step 16 transmits a release complete message REL COMP with respect to the receiving side AES 4. More particularly, this message REL COMP is transmitted to the receiving side AES 4 via the transmitting side ATM switching system 2 and the receiving side ATM switching system 3.

Next, a description will be given of a second embodiment of the signaling method according to the present invention.

In the first embodiment described above, the signaling information the receiving side ATM switching system 3 can obtained using the ILMI protocol is limited to that obtained for example from the receiving side AES 4 which is coupled to the side ATM switching system 3. Hence, in this embodiment, the signaling information obtained by the ATM switching system 3 is notified to each AES coupled to the ATM switching system 3, so that it is possible to smoothly set the connection among the AESs coupled to this ATM switching system 3. In other words, when communicating among the AESs coupled to the ATM switching system 3, it is possible from the start of the communication to generate and transmit a call setup message SETUP based on the signaling information of a known end to which the connection is to be made.

Next, a description will be given of a third embodiment of the signaling method according to the present invention.

In this embodiment, the signaling information obtained in the first embodiment described above is included in the message RE-SETUP which is generated by the receiving side ATM switching system 3. As a result, it is possible to share the signaling information included in the message RE-SETUP with the UNI A. In addition, with respect to the opposite direction, the signaling information may be included in the message from the transmitting side ATM switching system 2 by a similar method, so that the signaling information of the UNI A may be shared with the UNI B. Thus, according to this embodiment, it is possible from the start of the communication to generate an optimum call setup message SETUP based on the signaling information of the end to which the connection is to be made.

Next, a description will be given of the fourth embodiment of the signaling method according to the present invention.

Figure 9:
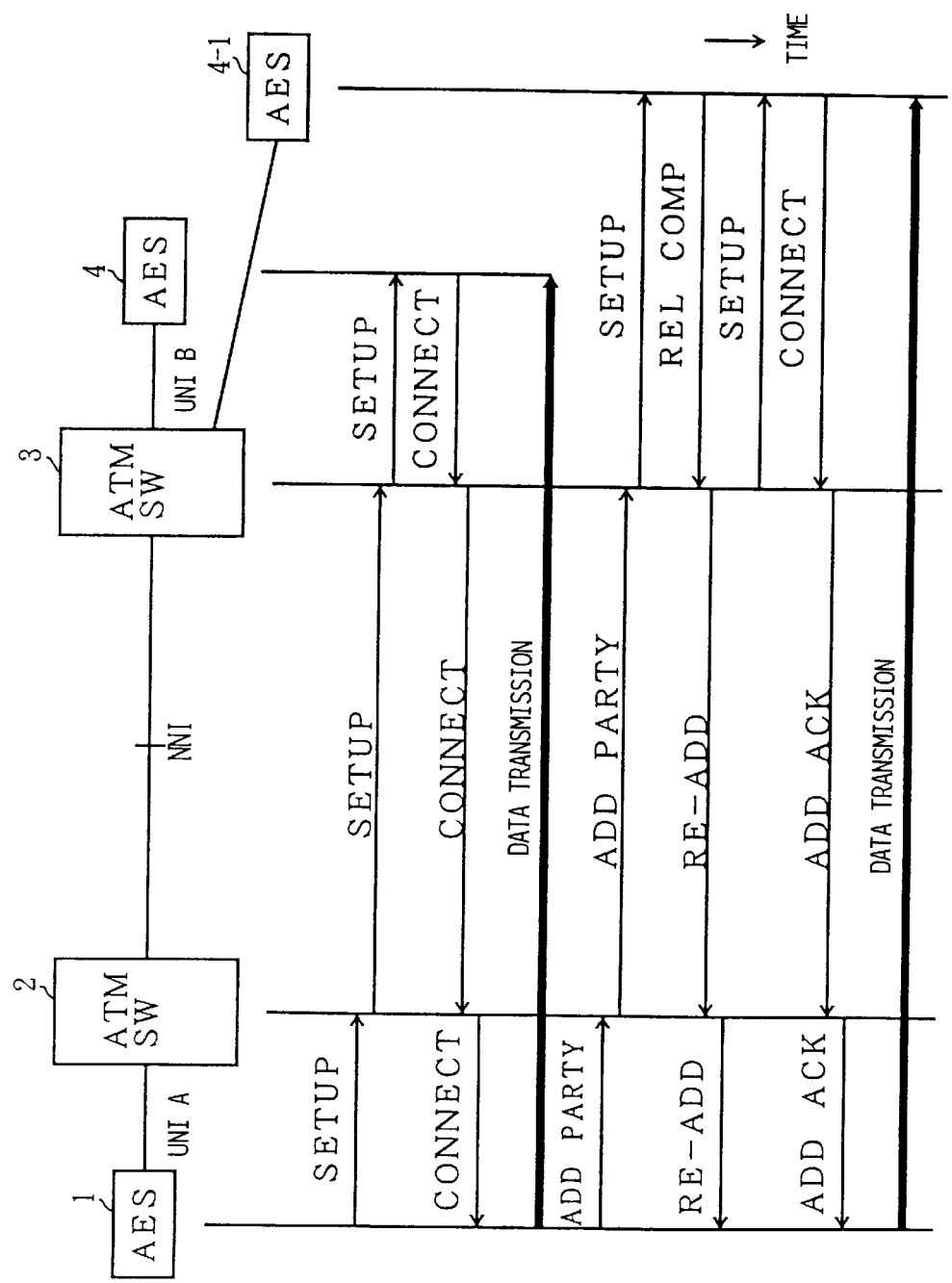
FIG. 9 is a diagram for explaining a connection establishing procedure in a fourth embodiment of the signaling method according to the present invention.

In this embodiment, the present invention is applied to a point-to-multi-point communication. FIG. 9 is a diagram for explaining a connection establishing procedure in this embodiment. In FIG. 9, those parts which are the same as those corresponding parts in FIG. 4 are designated by the same reference numerals, and a description thereof will be omitted. FIG. 9 shows a case where a call connection is made with respect to a second or subsequent AES which is coupled to the receiving side ATM switching system 3 after the first connection establishment by the AES 1 is successful. The procedure for a case where the first call connection fails becomes the same as that of the first embodiment described above.

When making the call connect request to the second or subsequent AES such as an AES 4-1 shown in FIG. 9 which is coupled to the receiving side ATM switching system 3 after the first call setup is completed, with respect to an active link, an add party message ADD PARTY is transmitted from the transmitting side AES 1 as shown in FIG. 9 in place of a setup message SETUP in order to distinguish this point-to-multi-point communication from the point-to-point communication. This message ADD PARTY is transferred to the receiving side ATM switching system 3 via the transmitting side ATM switching system 2.

The procedure thereafter is essentially the same as that of the first embodiment described above. However, in this embodiment, in order to distinguish the point-to-multi-point communication from the point-to-point communication, the receiving side ATM switching system 3 transmits a message RE-ADD in place of a re-setup message RE-SETUP to the transmitting side AES 1 via the transmitting side ATM switching system 2. The contents included in this message RE-ADD are essentially the same as the contents of the message SETUP which is re-transmitted by the receiving side ATM switching system 3 in the first embodiment described above. Furthermore, When the receiving side ATM switching system 3 receives a connect message CONNECT from the AES 4-1, the receiving side ATM switching system 3 transmits a message ADD ACK in place of the message CONNECT to the transmitting side AES 1 via the transmitting side ATM switching system 2, in order to distinguish the point-to-multi-point communication from the point-to-point communication.

The procedure for a case where the call setup with respect to the second or subsequent AES such as the AES 4-1 fails, is basically the same as that of the first embodiment described above.

Figure 10:
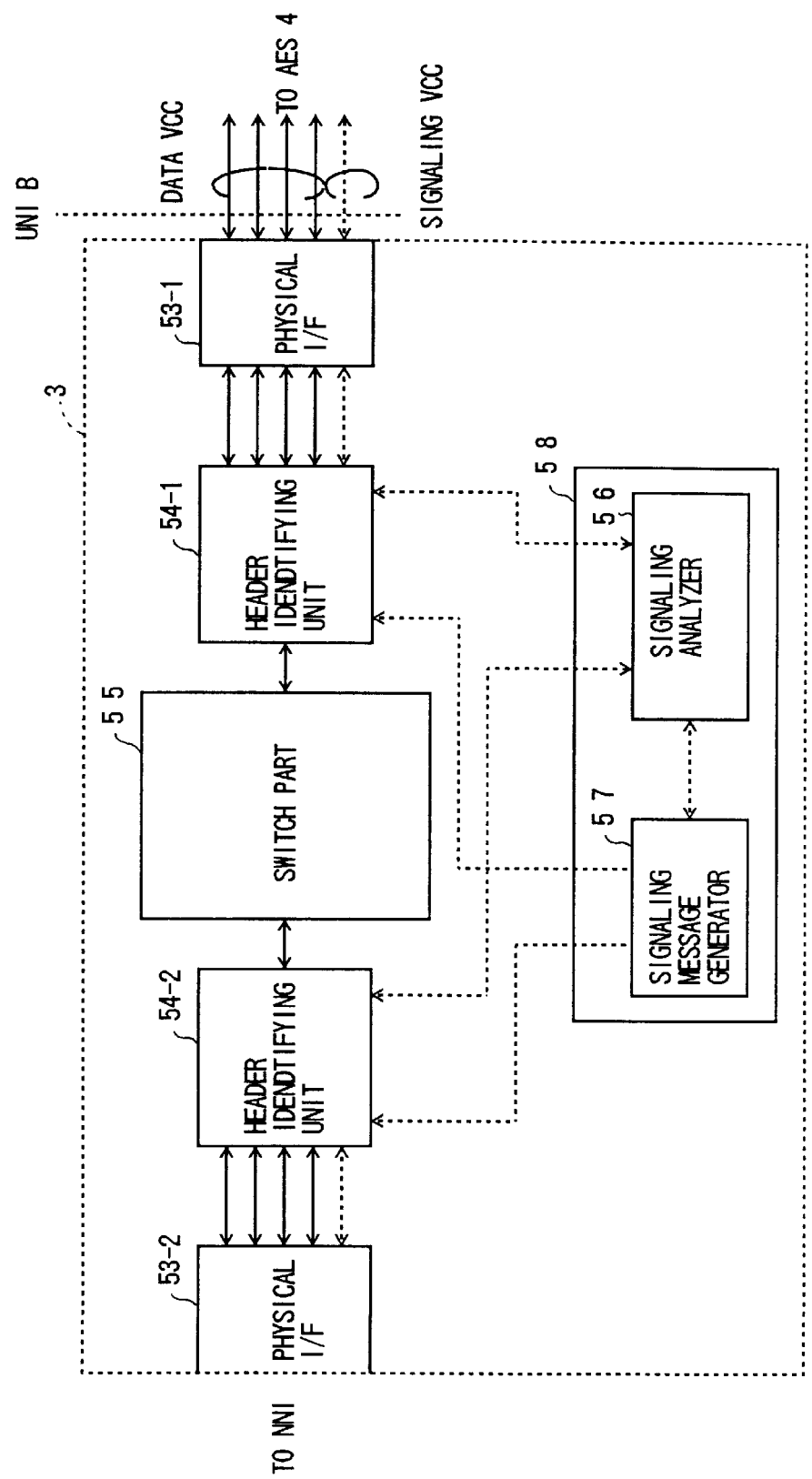
FIG. 10 is a system block diagram showing the construction of an embodiment of a switching system according to the present invention.

Next, a description will be given of an embodiment of a switching system according to the present invention, by referring to FIG. 10. In this embodiment, the present invention is applied to an ATM switching system of an ATM system. FIG. 10 is a system block diagram showing the construction of the ATM switching system which may be used in each embodiment of the signaling method described above.

Of course, the switching system according to the present invention is not limited to the ATM switching system, and may be any kind of network repeater system which supports a signaling protocol.

The ATM switching system 3 generally includes a physical interfaces (I/Fs) 53-1 and 53-2, header identifying units 54-1 and 54-2, a switch part 55, and a message processor 58 which are connected as shown in FIG. 10. The message processor 58 includes a signaling analyzer 56 and a signaling message generator 57. In the case of the ATM switching system 3, the physical I/F 53-1 is coupled to the AES 4 via the UNI B. On the other hand, the physical I/F 53-2 is coupled to the ATM switching system 2 via the NNI.

The physical I/F 53-1 is coupled to the AES 4 via the UNI B by a connection for user data (VCC for data, hereinafter referred to as data VCC) and a connection for signaling message transfer (VCC for signaling, hereinafter referred to as signaling VCC). In the case of the SVC, the connection identifier of the data VCC is set by the signaling procedure. In addition, the connection identifier for signaling is allocated to the connection identifier of the signaling VCC, within the standard of the ITU-T, ATM Forum or the like. The physical I/F 53-1 is a port which is coupled to a 52 Mbit/s or 155 Mbit/s optical fiber, Unshielded Twisted Pair Cable (UTP) or the like. The construction of the physical I/F 53-2 may basically be the same as that of the physical I/F 53-1.

The header identifying units 54-1 and 54-2 respectively identify a header which is located at the first 3 bytes of the ATM cell and includes the connection identifier and the like. The switch part 55 switches the ATM cells to appropriate paths depending on the connection identifier.

In the message processor 58, the signaling analyzer 56 analyzes the signaling message received from the signaling VCC, and carries out processes such as inspection of compatibility with the user and allocation of the connection identifier. In addition, the signaling message generator 57 generates the local response message, the release message and the like. The messages such as the message RE-SETUP, the message RE-ADD and the message ADD ACK used in the first through fourth embodiments of the signaling method described above are also generated by this signaling message generator 57.

The construction of the ATM switching system 2 may be the same as that of the ATM switching system 3.

Figure 11:
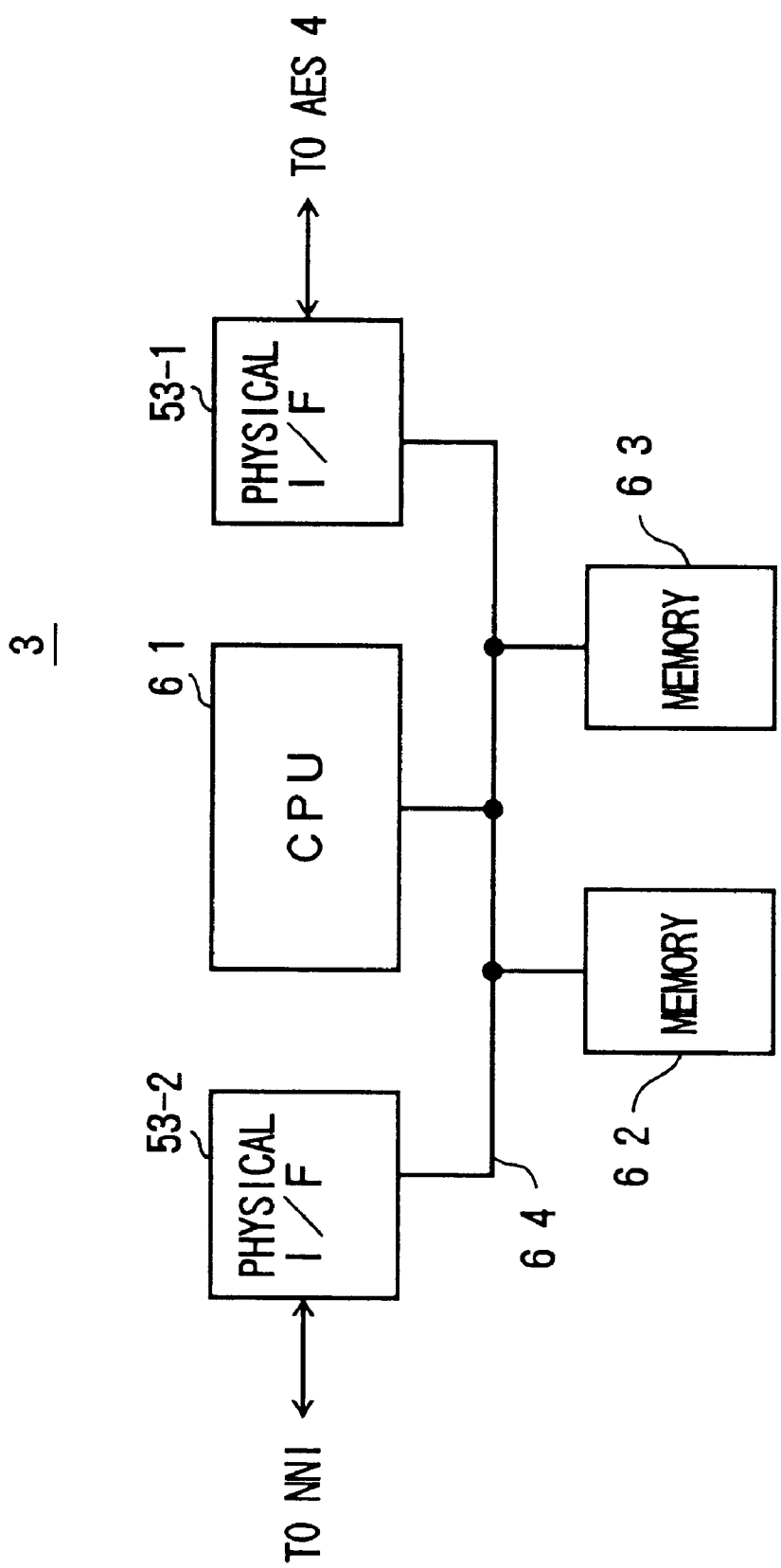
FIG. 11 is a system block diagram showing an embodiment of the construction for a case where the functions of an ATM switching system is realized by a processor.

At least the functions of the message processor 58 of the ATM switching system 3 (or 2) can be realized by a known processor which is made up of a central processing unit (CPU) and one or more memories. FIG. 11 is a system block diagram showing an embodiment of the construction for a case where the functions of the header identifying units 54-1 and 54-2, the switch part 55 and the message processor 58 are realized by such a processor.

In FIG. 11, a CPU 61 is coupled to the physical I/Fs 53-1 and 53-2, and memories 62 and 63, via a bus 64. The memory 62 is made up of a read only memory (ROM), for example, and stores data and programs to be executed by the CPU 61. On the other hand, the memory 63 is made up of a random access memory (RAM), for example, and stores intermediate data of computation processes carried out by the CPU 61 and the like. By storing one or programs for realizing the steps of each of the embodiments of the signaling method described above, it is possible to use the ATM switching system 3 (or 2) shown in FIG. 11 to realize each of the embodiments of the signaling method.

The memory 62 which stores one or more programs as described above forms an embodiment of a storage medium according to the present invention.

The storage medium according to the present invention stores commands or instructions which can be used to program a computer including a CPU to carry out the steps of the signaling method according to the present invention or to carry out the processes of the switching system according to the present invention. The storage medium according to the present invention may include, but is not limited to, any type of disk including floppy disks, optical disks, CD-ROMs and magneto-optic disks, ROMs, RAMs, EPROMs, EEPROMs, magnetic or optical cards, and any type of medium suitable for storing the commands or the instructions.

Figure 12:
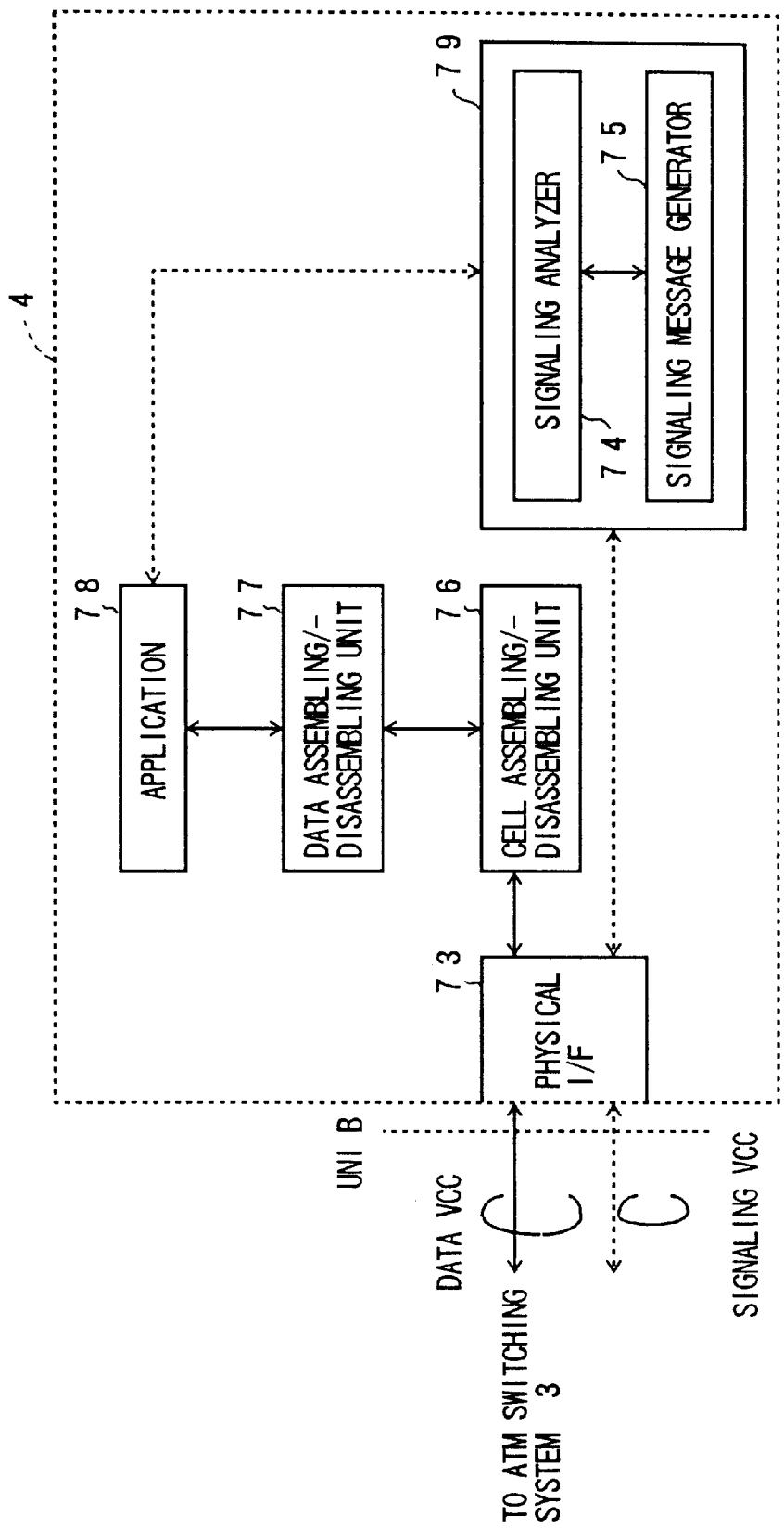
FIG. 12 is a system block diagram showing an embodiment of the construction of the AES.

FIG. 12 is a system block diagram showing an embodiment of the construction of the AES 4. The AES 4 generally includes a physical interface (I/F) 73, a cell assembling/disassembling unit 76, a data assembling/disassembling unit 77, an application 78, and a message processor 79 which are connected as shown in FIG. 12. The message processor 79 includes a signaling analyzer 74 and a signaling message generator 75.

The physical I/F 73 is coupled to the ATM switching system 3 via the UNI B by a connection for user data (data VCC) and a connection for signaling message transfer (signaling VCC). In the case of the SVC, the connection identifier of the data VCC is set by the signaling procedure. In addition, the connection identifier for signaling is allocated to the connection identifier of the signaling VCC within the standard such as the ITU-T and ATM Forum. The physical I/F 73 is a port which is coupled to a 52 Mbit/s or 155 Mbit/s optical fiber, UTP or the like.

In the message processor 79, the signaling analyzer 74 analyzes the signaling message which is received from the signaling VCC via the physical I/F 73. The analysis of the signaling message includes a judgement on whether or not the information elements forming the message are correct, a judgement on whether or not the request with respect to the service of the transmitting user, the quality, the band and the like can be accepted. The state transition timer used in the first embodiment of the signaling method described above is provided within the signaling analyzer 74, for example. In addition, the signaling message generator 75 generates the setup message SETUP for making the connection set request, the appropriate response message based on the analysis result of the signaling analyzer 74, and the like.

The cell assembling/disassembling unit 76 obtains the payload which is an information portion excluding the header, from the ATM cell which is received from the data VCC via the physical I/F 73.

In addition, the cell assembling/disassembling unit 76 adds the header to the data received from a higher layer, so as to generate the ATM cell. The data assembling/disassembling unit 77 assembles the data received from the cell assembling/disassembling unit 76. Further, the data assembling/disassembling unit 77 disassembles the data received from the higher layer into appropriate lengths. The application 78 carries out the data transmission and reception, and the connection set request related to the data transmission and reception.

Further, the present invention is not limited to these embodiments, but various variations and modifications may be made without departing from the scope of the present invention.

What is claimed is:

1. A signaling method for a communication using a signaling protocol, said signaling method comprising the steps of:

transmitting a call connect request for a receiving side end system, transmitted from a transmitting side end system, by a certain system which is coupled to the receiving side end system and saving a copy of the call connect request in the certain system; and when the receiving side end system rejects the call connect request from the transmitting side end system, as transmitted thereto by the certain system, modifying the saved call connect request and making a re-connect request in accordance with the modified saved call connect request with respect to the receiving side end system from the certain system, in place of the transmitting side end system.

2. The signaling method as claimed in claim 1, which further comprises the steps of:

obtaining, before making the re-connect request, version information of each signaling protocol of the receiving side end system coupled to said certain system.

3. The signaling method as claimed in claim 2, which further comprises the steps of:

notifying the version information of each signaling protocol obtained by said certain system to another end system coupled to said certain system.

4. The signaling method as claimed in claim 1, which further comprises the steps of:

notifying the transmitting side end system by a message that the re-connect request is made from said certain system when the receiving side end system rejects the call connect request from the transmitting side end system.

5. The signaling method as claimed in claim 4, which further comprises the steps of:

mapping, in said message, version information of a signaling protocol shared between said certain system and the receiving side end system.

6. The signaling method as claimed in claim 4, which further comprises the steps of:

holding a state of waiting for a response acknowledge message from the receiving side end system by controlling a timer which manages a timing with which the transmitting side end system returns a response message with respect to said message.

7. The signaling method as claimed in claim 1, which further comprises the steps of:

returning a release message including a reason for rejection to said certain system when the receiving side end system rejects the call connect request from the transmitting side end system.

8. The signaling method as claimed in claim 4, which further comprises the steps of:

transmitting a release message to said certain system when the transmitting side end system cannot accept contents of said message.

9. The signaling method as claimed in claim 1, wherein the communication is selected from a group consisting of a point-to-point communication and a point-to-multi-point communication.

10. A switching system relaying messages among networks by supporting a signaling protocol when making a communicating using the signaling protocol, said switching system being coupled to a receiving side end system and said switching system comprising:

means, coupled to a receiving side end system, for transmitting thereto a call connect request for the receiving side end system, transmitted from a transmitting side end system, and for saving a copy of the call connection request; and means for modifying the saved call connect request and making a re-connect request in accordance with the modified saved call connect request with respect to the receiving side end system, in place of the transmitting side end system, when the receiving side end system rejects the call connect request.

11. The signaling method as claimed in claim 10, which further comprises the steps of:

obtaining means for obtaining, before making the re-connect request, version information of each signaling protocol of the receiving side end system coupled to said certain system.

12. The switching system as claimed in claim 11, which further comprises:

notifying means for notifying the version information of each signaling protocol obtained by said obtaining means to another end system coupled to said switching system.

13. The switching system as claimed in claim 10, which further comprises:

notifying means for notifying the transmitting side end system by a message that the re-connect request is made from said switching system when the receiving side end system rejects the call connect request from the transmitting side end system.

14. The switching system as claimed in claim 13, which further comprises:

mapping means for mapping, in said message, version information of a signaling protocol shared between said switching system and the receiving side end system.

15. The signaling method as claimed in claim 10, which further comprises the steps of:

holding means for holding a state of waiting for a response acknowledge message from the receiving side end system by controlling a timer which manages a timing with which the transmitting side end system returns a response message with respect to said message.

16. The switching system as claimed in claim 10, wherein the communication is selected from a group consisting of a point-to-point communication and a point-to-multi-point communication.

17. A storage medium storing a program to be executed by a computer for making a switching system relay messages among networks by supporting a signaling protocol when making a communication using the signaling protocol, said switching system being coupled to a receiving side end system and said storage medium comprising:

means for transmitting a call connection request for a receiving side end system, transmitted from a transmitting side end system, by a certain system which is coupled to the receiving side end system and for saving a copy of the call connection request; and means for controlling said switching system to modify the saved call connect request and to make a re-connect request in accordance with the modified saved call connect request with respect to the receiving side end system, in place of the transmitting side end system, when the receiving side end system rejects the call connect request from the transmitting side end system.

18. The storage medium as claimed in claim 17, which further comprises:

obtaining means for controlling said switching system to obtain, before making the re-connect request, version information of each signaling protocol of end system coupled to said switching system.

19. The storage medium as claimed in claim 18, which further comprises:

notifying means for controlling said switching system to notify the version information of each signaling protocol obtained by said obtaining means to another end system coupled to said switching system.

20. The storage medium as claimed in claim 17, which further comprises:

notifying means for controlling said switching system to notify the transmitting side end system by a message that the re-connect request is made from said switching system when the receiving side end system rejects the call connect request from the transmitting side end system.

21. The storage medium as claimed in claim 20, which further comprises:

mapping means for controlling said switching system to map, in said message, version information of a signaling protocol shared between said switching system and the receiving side end system.

22. The storage medium as claimed in claim 17, which further comprises:

holding means for controlling said switching system to hold a state of waiting for a response acknowledge message from the receiving side end system by controlling a timer which manages a timing with which the transmitting side end system returns a response message with respect to said message.

23. The storage medium as claimed in claim 17, wherein the communication is selected from a group consisting of a point-to-point communication and a point-to-multi-point communication.

24. A network adapted to a communication using a signaling protocol, comprising:

means for transmitting a call connection request for a receiving side end system, transmitted from a transmitting side end system, by a certain system which is coupled to the receiving side end system and for saving a copy of the call connection request; and means for modifying the saved call connect request and making a re-connect request in accordance with the modified saved call connect request with respect to the receiving side end system from the certain system, in place of the transmitting side end system, when the receiving side end system rejects the call connect request.

25. The network as claimed in claim 24, which further comprises:

obtaining means for obtaining by said certain system, before making the re-connect request, version information of each signaling protocol of the receiving side end system coupled to said certain system.

26. The network as claimed in claim 25, which further comprises:

notifying means for notifying the version information of each signaling protocol obtained by said certain system to another end system coupled to said certain system.

27. The network as claimed in claim 24, which further comprises:

notifying means for notifying the transmitting side end system by a message that the re-connect request is made from said certain system when the receiving side end system rejects the call connect request from the transmitting side end system.

28. The network as claimed in claim 27, which further comprises:

mapping means for mapping, in said message, by said certain system, version information of a signaling protocol shared between said certain system and the receiving side end system.

29. The network as claimed in claim 27, which further comprises:

holding means for holding a state of waiting for a response acknowledge message from the receiving side end system by controlling a timer which manages a timing with which the transmitting side end system returns a response message with respect to said message.

30. The network as claimed in claim 24, which further comprises:

returning means for returning, from said certain system, a release message including a reason for rejection to said certain system when the receiving side end system rejects the call connect request from the transmitting side end system.

31. The network as claimed in claim 27, which further comprises:

transmitting means for transmitting a release message to said certain system when the transmitting side end system cannot accept contents of said message.

32. The network as claimed in claim 24, wherein the communication is selected from a group consisting of a point-to-point communication and a point-to-multi-point communication.

* * * * *